March 29, 1949.　　　C. B. FERREL　　　2,465,581
AIRPLANE CONSTRUCTION
Filed Aug. 7, 1945　　　2 Sheets-Sheet 1
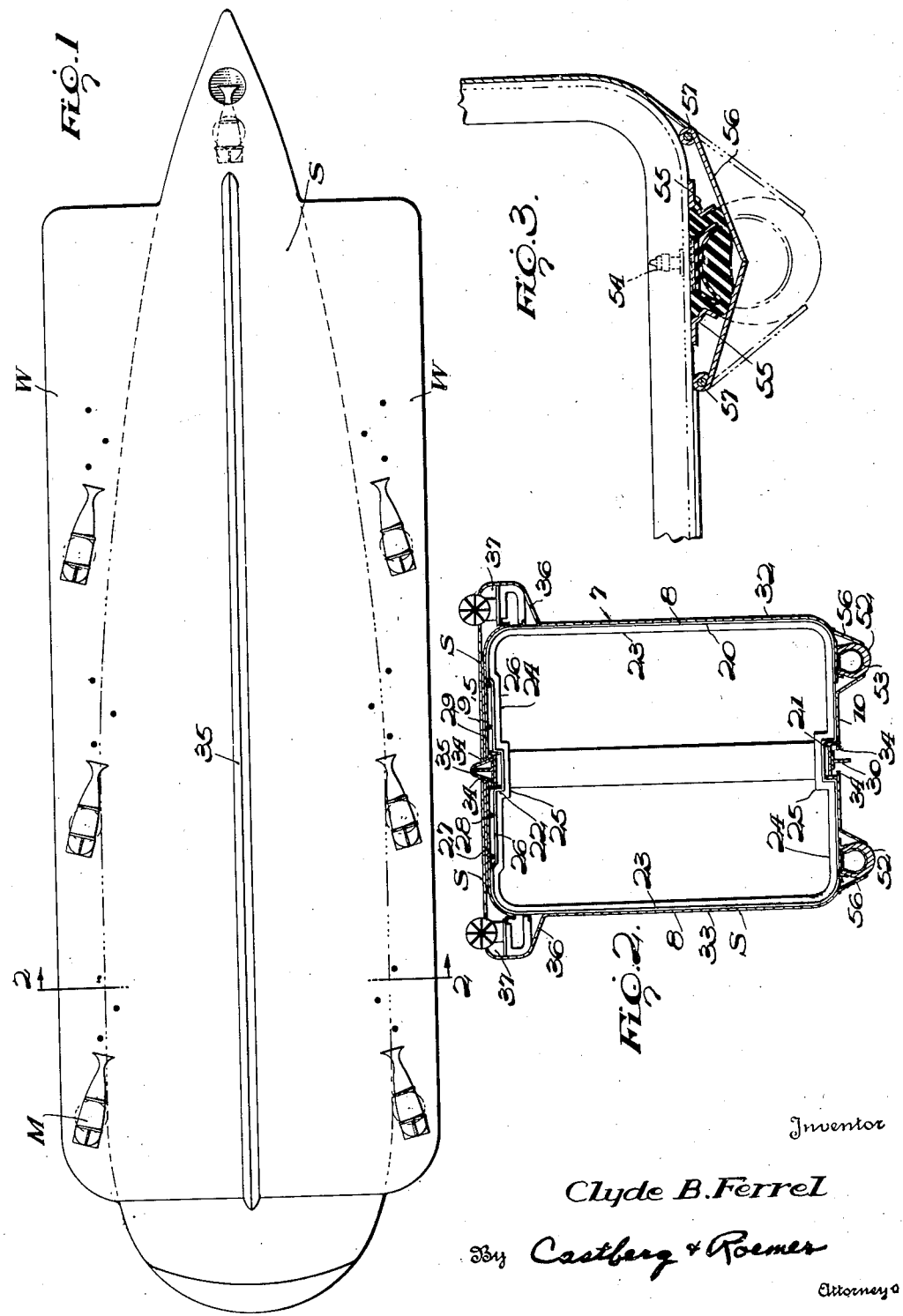
Inventor
Clyde B. Ferrel
By Castberg & Roemer
Attorneys

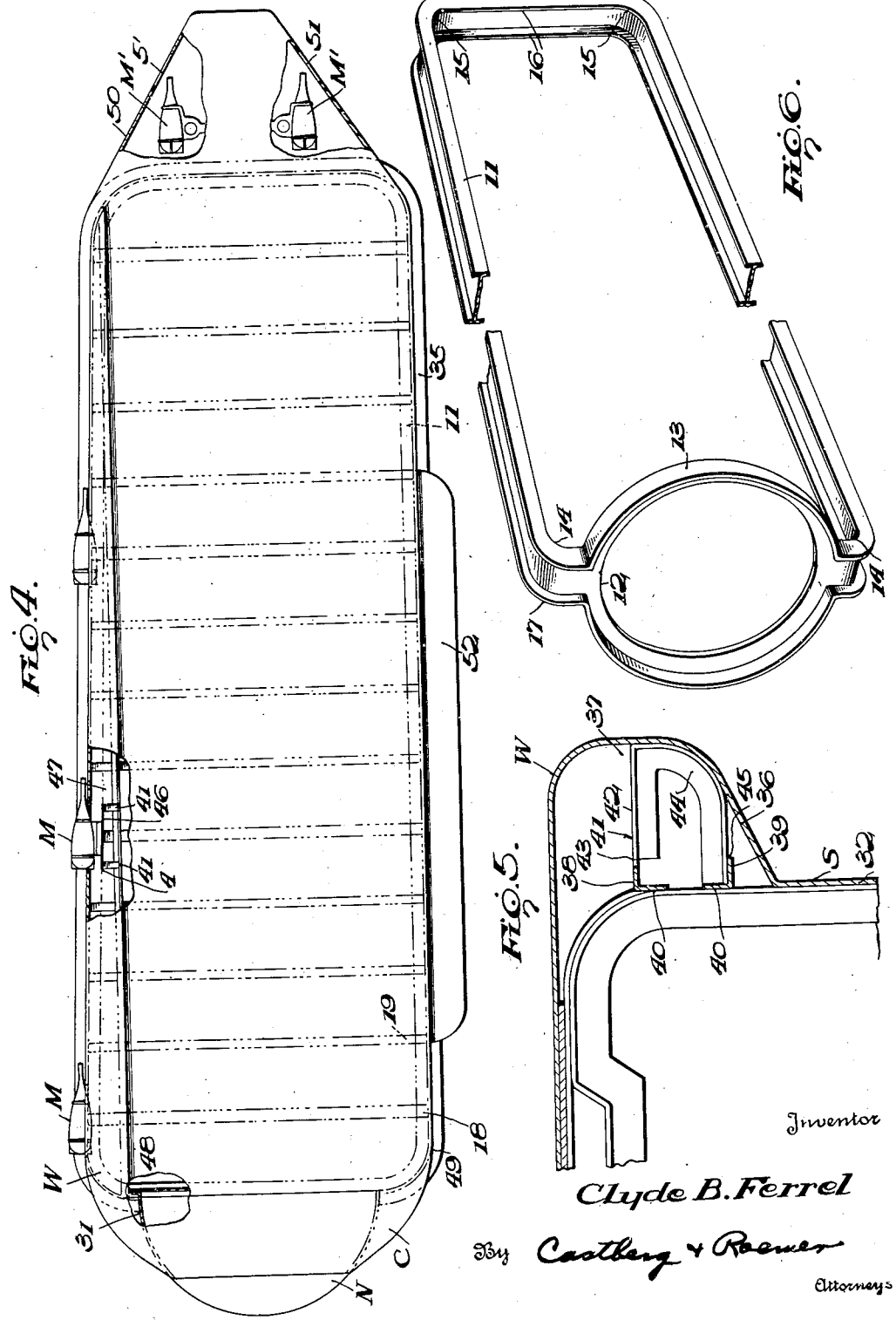

Patented Mar. 29, 1949

2,465,581

UNITED STATES PATENT OFFICE 2,465,581

AIRPLANE CONSTRUCTION

Clyde B. Ferrel, San Francisco, Calif., assignor to Ferrel Industries, Inc., Reno, Nev., a corporation of Nevada Application August 7, 1945, Serial No. 609,352

9 Claims. (Cl. 244—119)

This invention relates to airplane construction. The invention is directed more particularly to construction of rocket planes but, of course, is adapted to construction of other types of planes such as airplanes, hydroplanes, amphibious vehicles etc.

In constructing airplanes and other type aircraft and amphibious vehicles, the framework is usually fabricated from specially designed and made structural elements including beams both longitudinal and cross beams, braces etc. for such beams which necessarily results in construction which is very expensive and requiring the services of experts to fabricate this construction and applying the outer skin or covering.

In constructing the frame for my rocket plane and other types of airplanes etc. I utilize standard structural elements available on the market for several reasons including the fact that no specially designed structural beams, cross members and the like are used and the frame etc. is very simple and provides for an unusual structural strength and these structural beams etc. can be fabricated—properly arranged and secured together quickly and simply by ordinary mechanics. Therefore, the completed structure costs considerably less than completed structures of airplanes and the like made by present methods including the special shaped beams, cross members, braces etc. and my plane is ideally adapted for mass production and may be fabricated in its entirety on an assembly line, somewhat on the principle of assembly line operations regarding automobiles.

In view of the foregoing it is an object of my invention to provide a rocket plane construction, or similar airplane construction wherein standard materials of simple design and possessing structural strength are utilized to fabricate the complete plane fuselage or body which includes my specially designed wings.

Another object of my invention is to provide a main center frame member of readily available standard cross section which acts in effect as a mounting and bracing for cross members or ribs and which acts to stabilize and maintain the cross members or ribs in a definite spaced relationship with respect to each other and to the frame.

Another object of my invention is to provide in airplane construction a main frame which is completely formed in its entirety from standard available beams or the like which permits the cross members or ribs to be readily fixedly associated with and attached thereto in a minimum amount of time and where all structural elements are plainly visible in combining or associating the same which results in precision assembly.

Another object of my invention is to provide a framework for rocket planes and the like wherein the same is constructed of prefabricated elements of standard cross section which elements are precision formed in their precise exterior, contours and shapes and associated and connected together so that the plane body or fuselage will result in very effective streamlining.

Another object of my invention is to provide airplane or similar framework including a center section or frame which extends the length of the body of the plane or the like at its top, bottom and ends.

Another object of my invention is to provide airplane or similar framework including a center section or frame which extends the length of the body of the plane or the like at its ends, bottom and top and wherein the front end is fabricated so as to support a plastic or other nose and a cowling, if desired.

A further object of my invention is to provide a frame construction including a main center frame or spine and cross members or ribs spacedly affixed thereto for effecting a streamline for the plane as a whole and acting as a means for ready association therewith of the skin or covering to and about the framework.

Another object of my invention is to provide a plane structure including novel wings at opposite sides thereof, which wings are substantially of the same length of the body or fuselage of the plane and streamlined and acting as a support for one or more rocket motors.

Another object of my invention is to provide a plane structure including novel wings at opposite sides thereof which wings are substantially of the same length of the body or fuselage of the plane and streamlined and acting as a support for one or more rocket motors, and wherein the support for the motors acts to further brace and support cross members or ribs in their spaced relationship.

With these and other objects in view, the invention consists in the novel construction, arrangement and combination of parts hereinafter described, illustrated in the accompanying drawings and set forth in the claims hereto appended, it being understood that various changes in the scope of the claims may be resorted to without departing from the spirit or sacrificing any of the advantages of the invention.

In the drawings:

Fig. 1 is a top plan view of a rocket ship or plane embodying my new framework, body, wings etc.;

Fig. 2 is a transverse sectional view on the line 2—2 of Fig. 1 taken in the direction of the arrows;

Fig. 3 is a fragmentary view of the lower or bottom portion of the plane depicting novel skids utilized when landing the plane and showing the skids in an enclosed or non-usable position when the plane is in flight;

Fig. 4 is a side elevation view of my complete plane with some portions broken away to show detailed construction;

Fig. 5 is a vertical cross sectional view through a top side portion of my plane disclosing the mount for a rocket motor; and Fig. 6 is a perspective view of the main or center frame or section which extends throughout the length of the plane at its top, bottom and ends.

Like numerals in the several figures of the drawings denote the same parts.

The invention will be more readily understood by referring to the drawings in detail wherein it will be seen that my rocket or other type plane when viewed in top elevation as in Fig. 1 is substantially cigar shaped and the plane is of substantially the same shape at its bottom. In its entirety the fuselage or body of the plane is denoted at 7 and consists of opposite sides 8, a top 9 and a bottom 10. The opposite sides, top and bottom in some respects may be said to be flat but they do taper gracefully from the front end to the rear end of the plane and in this way the substantially cigar shape effect which provides for streamlining is obtained. The opposite side walls, it will be noted, are similarly gradually tapered or rounded from the front of the plane to the tail thereof and this same effect is generally carried out in the top 9 and the bottom 10 of the plane.

The structural characteristics of my rocket or similar plane or vehicle includes a main center section or frame 11 which is formed from a standard I-beam, see Fig. 6. This frame section 11 which, of course, is of structural steel or similar metal or alloy, is in one piece and is formed by taking a straight length of I-beam and splitting the web 12 of the same medially of the ends thereof and then expanding that split portion to provide a circular or other suitably shaped formation 13 and then bending the remainder of the two straight portions rearwardly as at 14 so that they are substantially parallel and bending these portions adjacent their ends 15 and bringing them into abutting relationship as at 16 and welding or otherwise securing the two ends together at that point. Of course, this center section or frame member could be formed by taking a straight section of I-beam or a channel shaped beam and splitting the web of the same adjacent one end and then bending the unsplit end backwardly and then upwardly and bending forwardly and then say welding or otherwise securing the free end at the point indicated at 17. The main feature of this frame is that it is constructed preferably from an I-beam but a channel beam may likewise be used and that it is in one piece and that the ring or other formation be effected which acts as a support for plastic or other nose or cowling, as hereinafter set forth.

Having formed the main center section or frame, as immediately set forth above, the cross members or ribs 18 and 19 are then suitably secured as by welding to this main frame. As seen in Figs. 2 and 4, the cross members are formed from channel irons of standard construction and these cross members are of one piece and are generally rectangular in outline. The cross members are formed into their rectangular shape and the ends united in abutting relationship by welding, as indicated at 20. Of course this abutting relationship of the ends might be at the side or top or bottom, as desired, and it is conceivable that they might be united at the point indicated at 21 and the welding together accomplished simultaneously with welding the cross members in spaced relationship to the I-beam frame. Further, welding, as at 22, of the cross members 18 and 19 may be effected between the same and the I-beam or any other securing means may be utilized. The cross members or ribs, 18 and 19, see Fig. 4, are of different widths and the rib 18 or the wider rib, it will be noted, occurs in the frame structure where the rocket motors hereinafter referred to are mounted in order to provide a firm, rigid and fixed support for these motors. These cross members 18 and 19 as they approach the rear of the plane are narrow and shorter and this, of course, provides for the streamlining effect of the plane, after the covering or skin S is applied and attached to the frame. The cross members, which are preferably formed of channel-irons, consist of oppositely disposed substantially parallel arranged side ribs 23 and similarly formed oppositely disposed top and bottom ribs 24. In order to maintain the streamline effect at the top and bottom of the plane, the cross members or ribs 18 and 19 in their spaced relationship attached to the main center frame 11 are depressed as at 25 and extend over and provide a seat or saddle for the I-beam 11 at the top and bottom of the frame. The depression is so calibrated and dimensioned as to receive the I-beam snugly therein and the latter is substantially flush with the top portion of the several cross members or ribs 18 and 19. Portions 26 opposite the depressed central part 25 at the top of the frame provide a recess 27 in which is mounted suitable rods or the like 28 which act as a support and spacing means for an asbestos or similar insulated sheet 29 which prevents heat developed in the rocket motors from entering the interior of the plane.

In order to further provide for a center section or spine for the plane, I insert a T-iron 30 in the outer web portion of the main section or frame 11 and this T-iron continues and is coextensive with the top, bottom and rear end of the frame 11 and the ends thereof stop short of the circular formation 13 at the forward part of the frame, as indicated at 31 in Fig. 4.

The skin or covering S which is preferably of suitable gauge metal or an alloy consists of two separate and distinct sections 32 and 33 which in cross section are of distorted U-shape. This covering or skin S is secured to the cross members or ribs 18 and 19 by welding, riveting or any other suitable manner and completely covers the sides 8 and each of the sections of the covering or skin S extends over the top and bottom of the frame and terminates at a point denoted at 34. In other words, the opposed ends of each of the sections at the top and bottom do not abut or meet but to the contrary provide a space therebetween in which is disposed an expansion joint 35 of metal or other suitable material and which expansion joint embraces the T-iron 30 and rests in the web of the I-beam frame 11, and is substantially coextensive with and disposed in the web of the frame 11, see Figs. 2 and 4.

By referring to Figs. 2 and 5 it will be seen that the skin or covering S is in close contact with the bottom and the greater portions of the sides of the cross members or ribs 18 and 19 up to a point substantially at the top of the plane where the skin is flared outwardly on opposite sides of the plane, as denoted at 36, and provides a compartment or space 37 in which a rocket motor M is mounted. This outwardly flared portion on opposite sides of the top of the plane constitutes wings W and serves a dual function in that it houses the mount for the aforesaid rocket motors at oppositely disposed spaced points in the wings. Only one of the mounts for the rocket motor is being described as the remainder of the mounts are the same. These motor mounts consist of angle irons 38 and 39 which run throughout substantially the length of the framework of the plane and are welded on opposite sides of the frame directly to the cross members or ribs 18 and 19, as denoted at 40. Suitable spaced braces 41 formed from angle or other structural elements present a top face 42 which is welded to the angle iron 38, as at 43, and is curved downwardly at 44 and extends substantially parallel to the portion 42 and is welded to the angle iron 39 as at 45. These braces 41 support a shelf 46 which is substantially flat and the motors M are bolted or welded directly thereto and it is understood that the shelf 46 is welded as at 47 to the spaced braces 41 which are in turn, as aforesaid, fixedly secured as by welding to the longitudinally spaced angle irons 38 and 39.

By referring to Figs. 1 and 4 it will be noted that the oppositely disposed wings W gradually taper from the forward end of the plane to the tail thereof. As shown in Figs. 2 and 5, the skin S extends over the braces 41 and actually forms the tapering wing structures at opposite sides at the top of the plane. As these wings extend on opposite sides of the plane to the rear thereof and as the body or fuselage of the plane is tapering or rounded, there is more of a supporting surface gradually from the front to the rear of the plane, as clearly seen in Fig. 1. In other words, while the wings gradually taper from the front to the rear of the plane, they also become wider transversely in section adjacent the rear end of the plane.

Suitable hemispherical or other shaped plastic or transparent nose N flanged as at 48 is retained and held in any suitable manner in the ring or other formation 13 of the main or center section frame 11. A cowling extends over a portion of the hemispherical nose end and is suitably secured in any desired manner, as at 49, to the plane proper. This rounded nose end and the cowling serves as a deflector for the air currents which are swept about the sides and bottom of the plane in its travel.

The rear end or tail of the plane 50 is sharply reduced and provides a compartment for rocket motors M' therein, the exhaust from which motors passes outwardly through suitable openings 51.

For landing purposes I provide two pneumatic tires 52 of elongated formation at opposite points of the bottom of the plane and which are coextensive with the greater portion of the length of the plane. These tires contain innertubes 53 which are inflatable and deflatable by means of the conventional valve stem 54 which, as seen in Fig. 3, extends interiorly of the plane. The tires are held in place by rim-irons 55 which conform to the shape of the beads of the tires in the usual manner and which irons are suitably maintained in their proper parallel relationship by welding the same directly to the bottoms of the cross members or ribs 18 and 19. These tires act as skids when the plane is landing and of course are inflated to absorb shock upon landing. In flight, however, it is desirable that the tires be deflated and this is accomplished by means of letting the air out of the valve stem 54 and the deflated tire and tube will then be brought into a compact condition, as disclosed in Fig. 3, by means of pivotally mounted flaps or closures 56 which are spring loaded on hinges, as at 57, and which automatically when in flight maintain the tires and tubes in their deflated compact condition and which closures are streamlined so as not to impede the forward progress of the plane.

From the foregoing it is believed quite clear that I have provided a very simple, economical and practical construction for rocket planes and the like which includes the use of standard structural elements, such as I-beams, channel irons, angle irons etc., all of which are readily and quickly assembled in their relationship with each other to make up the complete plane construction which is sound from an engineering standpoint as well as from the standpoint of recognized aeronautics and aerodynamics. It is understood that the skin or covering may be of one piece as regards each of the sections 32 and 33 or each section may comprise several individual sections to make up the complete skin or covering.

The rocket motors M referred to in this application are described in my application Serial No. 609,353, entitled "Rocket motors," filed concurrently herewith.

It is to be understood that the control for the motors is not a part of this invention and such control for the motors and the control of the plane as a whole is described and claimed in my patent application Serial No. 609,354, entitled "Rocket plane," filed concurrently herewith.

Having explained my invention, I claim:

1. A plane of the character described including a hollow streamlined body which consists of a top, opposite sidewalls and an interior framework, a covering for the framework, spaced longitudinal skids attached to the bottom of the plane, the said skids consisting of elongated pneumatic means which are capable of being inflated and deflated, and automatically operating means for each skid to completely enclose the same when deflated, said means including a pair of longitudinally extending flaps pivoted to the bottom of the plane at opposite sides of the skid to swing laterally in a vertical plane, said flaps when in closed position meeting at their free edges and extending at an inclination from the covering on the bottom of the plane.

2. A plane of the character described, including a main frame consisting of a single bar and composed of a central open longitudinal oblong frame section extending to the tail of the plane and having upper and lower substantially horizontal portions and a rear approximately vertical portion connecting said upper and lower portions, and a front open transversely disposed frame section of loop formation having sides formed by longitudinally divided portions of said bar, the terminals of said bar being connected together in abutting relation at a point remote from the front open transverse frame section.

3. A plane of the character described including a main frame consisting of a single channel bar composed of spaced flanges and a connecting web, said main frame comprising a central open longitudinal oblong frame section extending to the tail of the plane and having upper and lower approximately horizontal portions and a rear approximately vertical portion connecting said upper and lower portions, and a front open transversely disposed frame section of loop formation having sides formed by longitudinally divided portions of the channel bar with the flanges of the divided portions disposed peripherally of said front frame section.

4. A plane of the character described including a main frame consisting of a single channel bar composed of spaced flanges and a connecting web, said main frame comprising a central open longitudinal oblong frame section extending to the tail of the plane and having upper and lower approximately horizontal portions and a rear approximately vertical portion connecting said upper and lower portions, a front open transversely disposed frame section of loop formation having sides formed by longitudinally divided portions of the channel bar with the flanges of the divided portions disposed peripherally of said front frame section, and transversely disposed open rib-forming frames composed of top and bottom portions and upright connecting side portions, said rib-forming frames extending through and projecting laterally from the central oblong frame section of the main frame and secured to the top and bottom thereof.

5. A plane of the character described including a main frame consisting of a single channel bar composed of spaced flanges and a connecting web, said main frame comprising a central open longitudinal oblong frame section extending to the tail of the plane and having upper and lower approximately horizontal portions and a rear approximately vertical portion connecting said upper and lower portions, a front open transversely disposed frame section of loop formation having sides formed by longitudinally divided portions of the channel bar with the flanges of the divided portions disposed peripherally of said front frame section, and transversely disposed open rib-forming frames composed of top and bottom portions and upright connecting side portions, said rib-forming frames extending through and projecting laterally from the central oblong frame section of the main frame and secured to the top and bottom thereof, said top and bottom portions of the rib-forming frames being inset and forming feet for the top and bottom portions of the central section of the main frame to provide an interlocking connection between said frame for resisting lateral movement of the rib-forming frames with relation to the main frame.

6. A plane of the character described including a main frame consisting of a single channel bar composed of spaced flanges and a connecting web, said main frame comprising a central open longitudinal oblong frame section extending to the tail of the plane and having upper and lower approximately horizontal portions and a rear approximately vertical portion connecting said upper and lower portions, a front open transversely disposed frame section of loop formation having sides formed by longitudinally divided portions of the channel bar with the flanges of the divided portions disposed peripherally of said front frame section, transversely disposed open rib-forming frames composed of top and bottom portions and upright connecting side portions, said rib-forming frames extending through and projecting laterally from the central oblong frame section of the main frame and secured to the top and bottom thereof, and a skin composed of two approximately U-shaped sections covering the rib-forming frames, and an expansion joint between the sections of the skin.

7. A plane of the character described including a main frame consisting of a single channel bar composed of spaced flanges and a connecting web, said main frame comprising a central open longitudinal oblong frame section extending to the tail of the plane and having upper and lower approximately horizontal portions and a rear approximately vertical portion connecting said upper and lower portions, a front open transversely disposed frame section of loop formation having sides formed by longitudinally divided portions of the channel bar with the flanges of the divided portions disposed peripherally of said front frame section, transversely disposed open rib-forming frames composed of top and bottom portions and upright connecting side portions, said rib-forming frames extending through and projecting laterally from the central oblong frame section of the main frame and secured to the top and bottom thereof, a skin composed of two approximately U-shaped sections covering the rib-forming frames, and an expansion joint between the sections of the skin, and a T-iron secured in the channel of said bar and co-extensive therewith throughout the central oblong frame section and terminating at the front transverse frame section and supporting said expansion joint.

8. A plane of the character described including a main frame consisting of a single channel bar composed of spaced flanges and a connecting web, said main frame comprising a central open longitudinal oblong frame section extending to the tail of the plane and having upper and lower approximately horizontal portions and a rear approximately vertical portion connecting said upper and lower portions, a front open transversely disposed frame section of loop formation having sides formed by longitudinally divided portions of the channel bar with the flanges of the divided portions disposed peripherally of said front frame section, transversely disposed open rib-forming frames composed of top and bottom portions and upright connecting side portions, said rib-forming frames extending through and projecting laterally from the central oblong frame section of the main frame and secured to the top and bottom thereof, a skin covering said frames and extended laterally outwardly substantially throughout the length of the main frame to provide wings at opposite sides of the plane and provide motor compartments interiorly of the wings, upper and lower vertically spaced motor mounts, horizontally spaced braces conforming to the configuration of and supporting the wings interiorly at the lower portions thereof and having upper and lower horizontal portions secured to the motor mounts, the upper horizontal portions presenting upper horizontally aligned surfaces, and a shelf mounted upon said horizontal surfaces of the braces and arranged to support motors in a position to project exteriorly of the wings.

9. A plane of the character described including a main frame, transversely disposed open rib-forming frames composed of top and bottom portions and upright connecting side portions, said rib-forming frames secured to and projecting laterally from the main frame, a skin covering said frames and extended laterally outwardly substantially throughout the length of the main frame to provide wings at opposite sides of the plane, and provide motor compartments interiorly of the wing, upper and lower vertically spaced motor mounts secured to the rib-forming frames, horizontally spaced braces conforming to the configuration of and supporting the wings interiorly of the lower portions thereof and having upper and lower horizontal portions secured to the motor mounts, the upper horizontal portions presenting upper horizontally aligned surfaces, and a shelf mounted upon said horizontal surfaces of the braces and arranged to support a motor in a position to project exteriorly of the wings.

CLYDE B. FERREL.

REFERENCES CITED

The following references are of record in the file of this patent:

UNITED STATES PATENTS

| Number | Name | Date |
| --- | --- | --- |
| 922,972 | Thompson | May 25, 1909 |
| Re. 18,143 | Crozier | Aug. 4, 1931 |
| 1,848,578 | Scroggs | Mar. 8, 1932 |
| 2,132,529 | Firner | Oct. 11, 1938 |
| 2,183,323 | Moss | Dec. 12, 1939 |
| 2,395,435 | Thompson et al. | Feb. 26, 1946 |

FOREIGN PATENTS

| Number | Country | Date |
| --- | --- | --- |
| 5,707 | Great Britain | 1915 |
| 10,481 | Great Britain | 1915 |
| 396,560 | France | Jan. 29, 1909 |
| 397,560 | France | Mar. 9, 1909 |
| 360,951 | Great Britain | Nov. 11, 1931 |

OTHER REFERENCES

"Aviation" of April 20, 1929, page 1318.